(12) United States Patent
Lean et al.

(10) Patent No.: US 7,793,372 B2
(45) Date of Patent: Sep. 14, 2010

(54) LATEX FOAM BEDDING PRODUCTS INCLUDING PHASE CHANGE MICROCAPSULES

(75) Inventors: John T. Lean, Naugatuck, CT (US); George Suplee, Vero Beach, FL (US); Derek R. Bobowick, Sandy Hook, CT (US)

(73) Assignee: Latex Foam International Holdings, Inc., Shelton, CT (US)

( * ) Notice: Subject to any disclaimer, the term of this patent is extended or adjusted under 35 U.S.C. 154(b) by 0 days.

(21) Appl. No.: 12/246,575

(22) Filed: Oct. 7, 2008

(65) Prior Publication Data
US 2009/0288259 A1  Nov. 26, 2009

Related U.S. Application Data

(60) Provisional application No. 61/055,852, filed on May 23, 2008.

(51) Int. Cl.
*A47C 21/00* (2006.01)
(52) U.S. Cl. .................... 5/740; 5/690; 5/655.9
(58) Field of Classification Search ............. 5/421–423, 5/653, 740, 655.9, 690; 264/45.4
See application file for complete search history.

(56) References Cited

U.S. PATENT DOCUMENTS

| | | | |
|---|---|---|---|
| 4,756,958 A | 7/1988 | Bryant et al. | |
| 4,807,696 A | 2/1989 | Colvin et al. | |
| 4,911,232 A | 3/1990 | Colvin et al. | |
| 5,141,079 A | 8/1992 | Whitney et al. | |
| 5,224,356 A | 7/1993 | Colvin et al. | |
| 5,366,801 A | 11/1994 | Bryant et al. | |
| 5,415,222 A | 5/1995 | Colvin et al. | |
| 5,499,460 A | 3/1996 | Bryant et al. | |
| 5,637,389 A | 6/1997 | Colvin et al. | |
| 5,763,335 A | 6/1998 | Hermann | |
| 5,804,297 A | 9/1998 | Colvin et al. | |
| 6,093,910 A | 7/2000 | McClintock et al. | |
| 6,183,855 B1 * | 2/2001 | Buckley | 428/317.9 |
| 6,298,907 B1 | 10/2001 | Colvin et al. | |
| 6,582,456 B1 | 6/2003 | Hand et al. | |
| 6,699,266 B2 * | 3/2004 | Lachenbruch et al. | 607/96 |
| 7,191,478 B2 | 3/2007 | Schmidt | |

\* cited by examiner

*Primary Examiner*—Fredrick Conley
(74) *Attorney, Agent, or Firm*—St. Onge Steward Johnston & Reens LLC

(57) ABSTRACT

A bedding product including an upper surface defining a sleeping position, a plurality of capsules, each including a phase change material, a first layer including latex foam and the plurality of capsules distributed throughout the latex foam, at least one second layer adjacent below the first layer, and wherein the first layer is less than about 2 inches below the upper surface.

4 Claims, 6 Drawing Sheets

LATEX FOAM BEDDING PRODUCTS INCLUDING PHASE CHANGE MICROCAPSULES

CROSS-REFERENCE TO RELATED APPLICATIONS

The present application claims the benefit under 35 U.S.C. §119(e) of the U.S. Provisional Patent Application Ser. No. 61/055,852, filed on May 23, 2008, the content of which is incorporated herein by reference.

FIELD OF THE INVENTION

The invention relates to a latex foam bedding products, and more specifically to latex foam bedding products including phase change microcapsules incorporated into the latex foam.

BACKGROUND OF THE INVENTION

Phase change materials ("PCM") operate on the principle that a material requires a relatively significant amount of energy (heat) to change from a solid to a liquid and then back from a liquid to a solid. PCM can therefore absorb large amounts of heat or energy from their environment and return large amounts of heat to their environment. This effective absorption, store and release of heat can be used to regulate the temperature of an environment.

PCM has been used in various applications ranging from household insulation to clothing. For example, U.S. Pat. No. 5,637,389 to Colvin et al. discloses an insulative pad for a shoe insole including microcapsules containing a phase change material in a polymeric base layer. U.S. Pat. No. 5,499,460 to Bryant and Colvin discloses another such insulative pad for shoe insoles. U.S. Pat. No. 6,183,855 to Buckley discloses a composite material having a flexible matrix containing a phase change storage material. Buckley discloses using the composite material in wet suits, boot liners, socks, gloves, face masks and a metabolic heating or cooling blanket.

U.S. Pat. No. 6,699,266 to Lachenburch et al. discloses a bed mattress including PCM. The PCM is distributed in a gel or viscous fluid carrier in a thermal layer of the mattress. The thermal layer includes a conforming envelope containing the phase change material in the fluid carrier. U.S. Pat. No. 7,191,478 to Schmidt discloses a sleeping device including a layer of a material having temperature regulating properties and a layer of down filling. In Schmidt, a substrate is coated with a phase change material or a fiber is manufactured incorporating the phase change material to make the temperature regulating layer. The temperature regulating layer is split into channels by splitting walls and down filling is put into the channels.

It is therefore desired to develop a way to obtain the benefits of PCM in bedding products without requiring fluid envelopes or channels within the bedding product. It is further desired to provide bedding products with a substantial layer of PCM not achievable by use of fluid carriers or coatings. It is further desired to provide bedding products with an even and consistent distribution of PCM that is cost effective and easy to manufacture.

SUMMARY OF THE INVENTION

Accordingly, it is an object of the present invention to provide bedding products including a latex foam composition including phase change microcapsules distributed in the latex foam.

These and other objectives are achieved by providing a bedding product, such as a mattress or pillow, including an upper surface defining a sleeping position, a plurality of capsules, each including a phase change material, a first layer including latex foam and the plurality of capsules distributed throughout the latex foam, at least one second layer adjacent below the first layer, and wherein the first layer is less than about 2 inches below the upper surface. In some embodiments, the first layer is less than about 0.5 inches from the upper surface.

In some embodiments, the first layer includes about 8 to about 20 phr of the capsules. The phase change material may change phase at about 78.5 degrees (F.).

In some embodiments, the first layer has a thickness greater than about 0.4 inches or between about 0.75 inches and about 3 inches. The capsules may have a particle size of about 3 micron to about 15 microns.

In some embodiments, the second layer includes only of latex foam, and wherein the first and second layers are formed as a single continuous layer. The first and second layers may be formed as a single continuous layer by a cast on top process or a simultaneous cast process.

In some embodiments, the first layer is quilted between an upper ticking layer and the second layer.

Further provided is a mattress including a plurality of capsules, each including an upper surface defining a sleeping position, a phase change material, a first layer including of latex foam and about 8 to about 20 phr of the capsules distributed throughout the latex foam, wherein the first layer has a thickness between about 0.75 inches and about 3 inches, at least one second layer adjacent below the first layer, and wherein the first layer is less than about 0.5 inches below the upper surface.

Other objects of the present invention are achieved by provision of a method of manufacturing a latex foam bedding product, including the steps of combining one or more rubber materials with at least one soap and a curing agent to form a composition, blending a plurality of capsules into the foamed composition at a concentration of about 8 to about 20 phr, each capsule including a phase change material, foaming the composition, forming a first layer from the foamed composition, cutting the first layer to size, and combining the first layer with at least one second layer. In some embodiments, the first layer is positioned above the second layer, and wherein the first layer positioned is less than about 0.5 inches below a sleeping position of the bedding product.

Other objects of the invention and its particular features and advantages will become more apparent from consideration of the following drawings and accompanying detailed description.

DETAILED DESCRIPTION OF THE INVENTION

The invention relates to latex foam bedding products with phase change microcapsules (PCM) incorporated into the latex foam. The composition may be used for many bedding product applications but is particularly suitable for use in latex foam mattresses and pillows.

Figure 1:
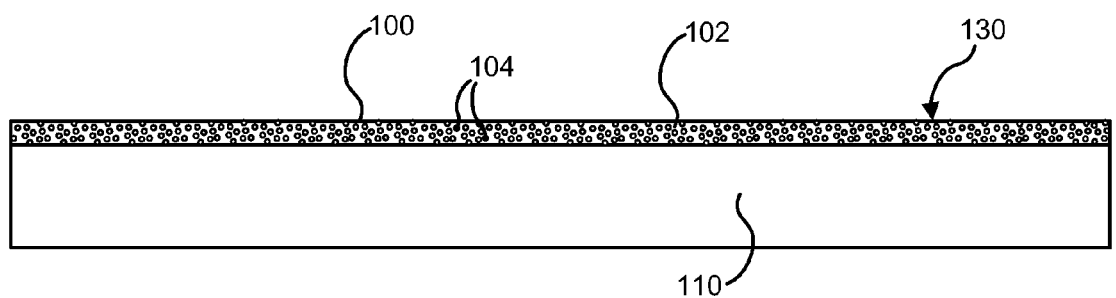
FIG. 1 is a bedding product according to an exemplary embodiment of the present invention.

FIG. 1 shows a bedding product according to an exemplary embodiment of the present invention. The bedding product is preferably a mattress. The bedding product includes a first layer 100. The first layer 100 is comprised of latex foam 102 including a plurality of capsules 104 distributed throughout the foam. The capsules 104 include a phase change material. The bedding product further includes one or more second layers 110 adjacent the first layer 100. The second layer 110 may include latex foam 102 and/or poly materials. The second layer 110 may also include a box spring portion of the bedding product.

The thickness of the first layer 100 is generally determined by comfort level, however, with regards to temperature regulation, as the foam thickness increases so does the absolute amount of PCM. The first layer 100 may have a thickness ranging from about 0.4 inches up to about 6 inches. The preferred thickness has been found to be in the range of about 0.75 inches to about 3 inches for temperature regulating impact and comfort.

Figure 2:
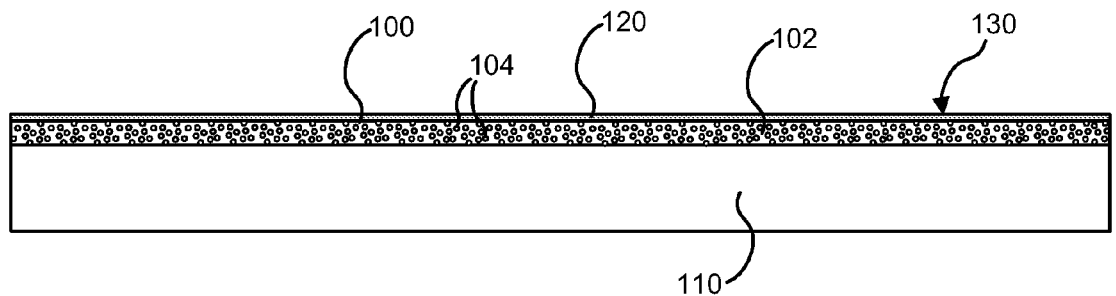
FIG. 2 is a bedding product according to an exemplary embodiment of the present invention.

The temperature regulating effects of the PCM are maximized through its proximity to the body of the sleeper. The first layer 100 is therefore preferably the top layer in the bedding product with an upper surface 130 as shown in FIG. 1. As shown in FIG. 2, the first layer 100 may also be positioned below a second layer 120, such as a quilt layer. Excessive amounts of quilt materials above the first layer 100 will reduce the effectiveness of the PCM's temperature regulation. Therefore, the distance from the first layer 100 to the upper surface 130 of the bedding product and/or the sleeping position is less than about 2 inches. In preferred embodiments, the first layer 100 is less than 0.5 inches from the sleeping position, or directly adjacent to the sleeping position.

Figure 3:
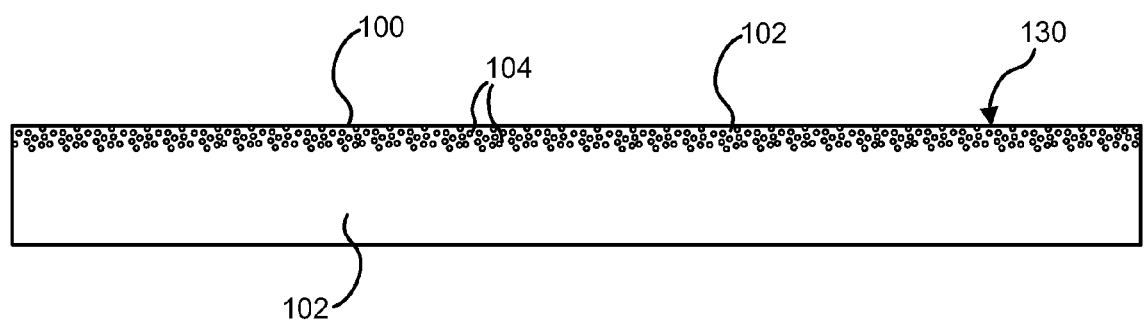
FIG. 3 is a bedding product according to an exemplary embodiment of the present invention.

FIG. 3 shows another embodiment of the bedding product. The bedding product includes the first layer 100 comprised of latex foam 102. In the exemplary embodiment, capsules 104 are distributed throughout a top portion of the first layer 100 only. The bottom portion of the first layer 100 includes only latex foam. One or more second layers (not shown) may also be positioned adjacent to the first layer 100. The embodiment shown in FIG. 3 may be manufactured using a simultaneous cast or cast on top process as further described below.

Figure 4:
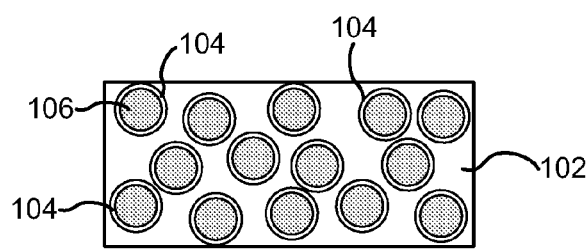
FIG. 4 is a portion of a latex foam layer of the bedding product shown in FIGS. 1-3.

FIG. 4 illustrates a portion of the first layer 100 including capsules 104. The capsules 104 have an outer shell, such as an acrylic polymer shell. The capsules 104 include, inside the shell, a phase change material 106, such as a wax, that absorbs and releases energy by changing phase (e.g., solid to liquid). In the exemplary embodiment, the phase change occurs at approximately 78.5 degrees Fahrenheit (F.). However, the phase change may occur at different temperatures if desired.

Phase change capsules are available in a various sizes. In foam, depending upon the mode of manufacture, PCM particle sizes from 1 micron up to 25 microns was found to be feasible. In a preferred embodiment, the capsules 104 are 3 to 5 microns in diameter. In another preferred embodiment, the capsules 104 are 12 to fifteen 15 microns in diameter. Capsules 104 being 12 to fifteen 15 microns in diameter were found to be easier to get in a slurry state under some conditions.

Testing was performed to determine the ideal concentration levels of PCM material for temperature regulation in the bedding products according to the present invention. In the latex foam industry, raw materials levels in the compound are generally described in parts per hundred parts rubber (phr). In the present invention, the PCM material was tested at 8, 10, 12, 15, 20, 25 and 30 phr. Performance testing showed that the greater the number of parts incorporated the more impact was seen on the heat capacity or temperature regulating factor in the bedding product. PCM level in the latex foam is dependent upon thickness and density of the foam and can be made as low as 5 phr and as high as 60 phr. A concentration of 8 to 20 phr of PCM was found to be preferable.

Figure 5:
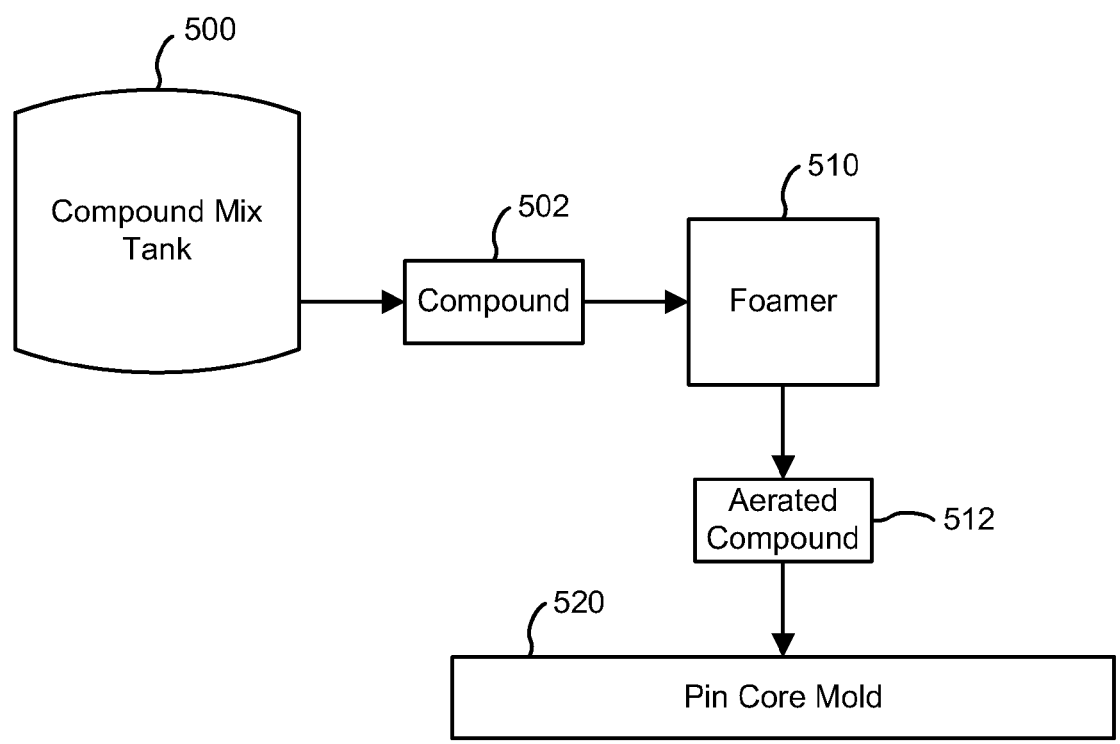
FIG. 5 illustrates an exemplary process for manufacturing a bedding product according to the present invention.

FIG. 5 illustrates an exemplary process for manufacturing the composition used in the present invention. Blends of natural and synthetic latex rubber are combined with soap, curing agents and/or several other processing aid materials into a compound mix tank 500. The PCM microcapsules 104 are blended into a slurry form and then mixed in during this compounding stage. The resulting compound 502 is then sent through a foamer 510 incorporating air into the compound 502 to form a foamed compound 512.

Various means may then be employed to incorporate the foamed compound 512 into a bedding product. As shown by way of example in FIG. 5, the foamed compound 512 may be added to a pin-core mold 520 in a talalay process. In the talalay process, the foamed compound 512 is added to the mold 520 and the mold 520 is sealed shut. The mold 520 and compound 512 are subjected to a specific series of vacuum, freezing, gas injection and heating. The molded compound is then washed with water and dried in an oven for approximately 2 hours to complete a curing cycle of the compound. The finished latex foam compound is then fabricated to size and used in mattresses, from twin XL up to California Kings, and in pillows.

The foamed compound may also be formed into a bedding product using a continuous process (not shown). In the continuous process, the foamed compound is cast onto a moving belt, e.g., from a casting wand. The moving belt transports the foamed compound through a series of processes (e.g., by means of a roller). The first step is a metering system which uses a doctor blade to establish the height or thickness of the casting. The foamed compound coming under the doctor blade is then subjected to an infrared (IR) light then passed through a steam box and then finally through a drier. The compound is gelled, then vulcanized and then dried. At the end of the continuous process the material may be trimmed, punched and cut to length or wrapped onto rolls.

Figure 6:
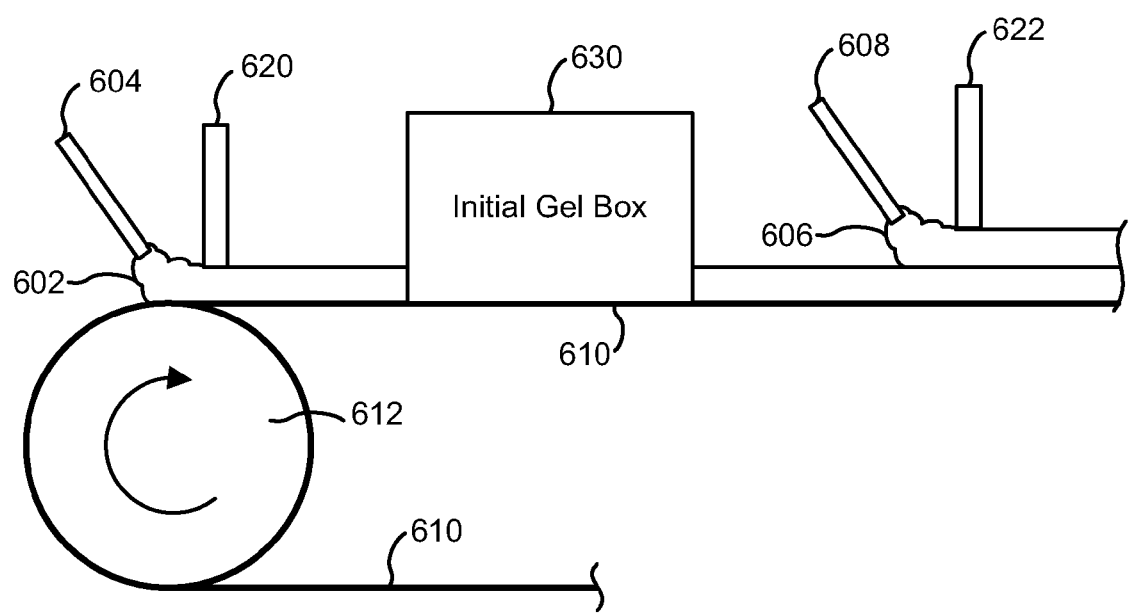
FIG. 6 illustrates an exemplary process for manufacturing a bedding product according to the present invention.

The foamed compound including PCM may also be combined with one or more additional latex foam layers to form the bedding product shown in FIG. 3. This may be accomplished by means of a simultaneous cast process or a cast on top process. FIG. 6 illustrates the simultaneous cast process. A first foamed compound 602 (e.g., without PCM) is cast onto a moving belt 610 from a casting wand 604. The moving belt 610 transports the foamed compound 602 by means of a roller 612. The foamed compound 602 passes under a first doctor blade 620 to establish a first height or thickness. The foamed compound 602 is then passed through an initial gel box 630 to gel the foam compound 602 enough to act as a substrate.

A second foamed compound 606 (e.g., with PCM) is cast onto the first foamed compound 602 via a casting wand 608. The second foamed compound 606 passes under a second doctor blade 622 to establish a second height or thickness. The combined first and second foamed compound are then vulcanized and dried to form one continuous layer as shown in FIG. 3. At the end of the simultaneous cast process the material may be trimmed, punched and cut to length or wrapped onto rolls.

Figure 7:
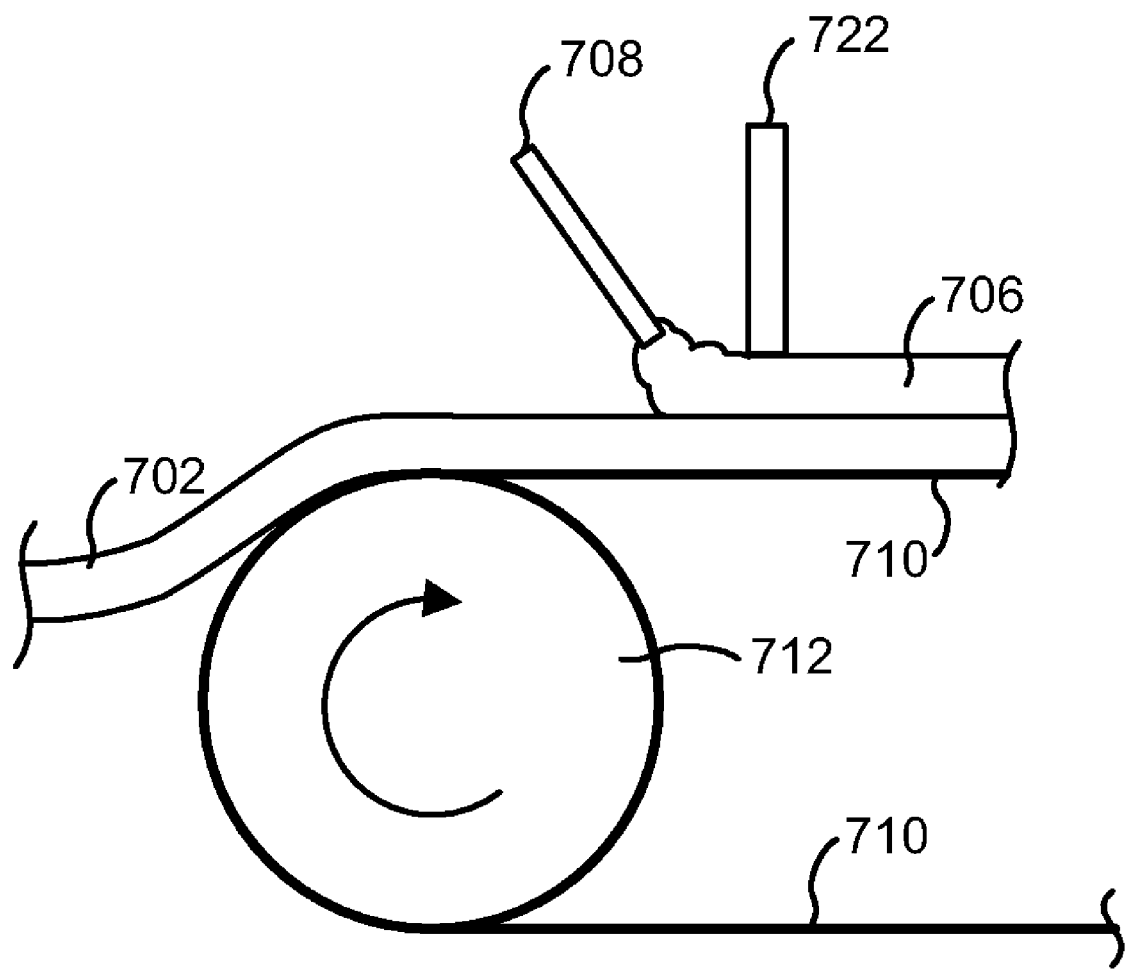
FIG. 7 illustrates an exemplary process for manufacturing a bedding product according to the present invention.

FIG. 7 illustrates the cast on top process. A layer of finished foam 702 (e.g., without PCM) is transferred onto a moving belt 710. A second foamed compound 706 (e.g., with PCM) is cast onto the layer of finished foam 702 via a casting wand 708. The second foamed compound 706 passes under a doctor blade 722 to establish a height or thickness. The combined first and second foamed compounds are then vulcanized and dried to form one continuous layer as shown in FIG. 3. At the end of the simultaneous cast process the material may be trimmed, punched and cut to length or wrapped onto rolls.

Latex foam layers including PCM according to the present invention may also be used in a quilted panel or layer (not shown). For example, a quilted panel including one or more latex foam and PCM layers may be manufactured for use as top layer on a mattress. The latex foam including PCM may be substituted for other foam layers and/or interspersed with fabric and/or ticking layers in the quilted panel. Any general quilting processes may be used. For example, the layer of latex foam including PCM may be provided together with one or more top layers of ticking and one or more bottom layers of scrim or ticking. The layers may then be quilted together, e.g., using a tack and jump stitching apparatus, to form the quilted panel.

Figure 8:
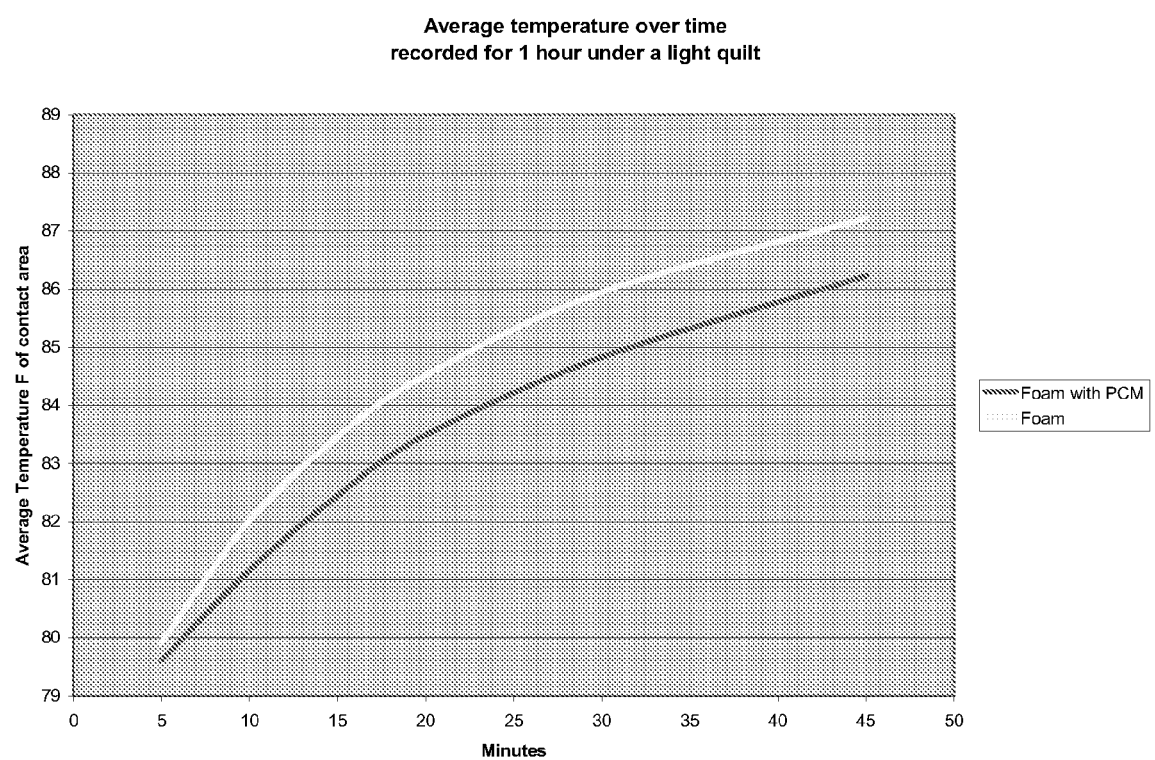
FIG. 8 is a graph illustrating a comparison of the average temperature over time for a bedding product according to the present invention and a prior art latex foam bedding product.

FIG. 8 is a graph illustrating a comparison of the average temperature over time for a bedding product according to the present invention versus a latex foam bedding product without phase change microcapsules. The testing was conducted in several forms. Heat capacity testing was conducted with an infra-red camera which will read and record through thermal imaging the surface temperature of objects. Heat was applied to products that contained different levels of the PCM material and then removed.

As illustrated in FIG. 8, the bedding products with PCM retain energy longer than those that did not have PCM in them. Interface temperature regulation was tested by using a series of thermocouples laid in between a heat source (human body) and the foam product. An average temperature was recorded for the contact area sensed by the thermocouples. The average temperature readings show that the interface temperature between the body and the foam was lower over time on products containing the PCM material. In particular, the temperature was found to be approximately 1 degree (F.) lower than in the conventional latex foam bedding product after 13 minutes. The temperature difference was also found to be approximately 1 degree (F.) lower after 45 minutes.

Although the invention has been described with reference to a particular arrangement of parts, features and the like, these are not intended to exhaust all possible arrangements or features, and indeed many modifications and variations will be ascertainable to those of skill in the art.

What is claimed is:

1. A method of manufacturing a latex foam bedding product, comprising the steps of:

combining one or more rubber materials with at least one soap and a curing agent to form a composition;

blending a plurality of capsules into the foamed composition at a concentration of about 8 to about 20 phr, each capsule comprising a phase change material;

foaming the composition;

forming a first layer from the foamed composition;

cutting the first layer to size; and combining the first layer with at least one second layer.

2. The method according to claim 1, wherein the first layer is positioned above said second layer, and wherein said first layer positioned is less than about 0.5 inches below a sleeping position of the bedding product.

3. The method according to claim 1, wherein said first and second layers are combined together into a single continuous layer by a cast on top process.

4. The method according to claim 1, wherein said first and second layers are combined together into a single continuous layer by a simultaneous cast process.

* * * * *